May 7, 1929.  R. W. JENKINS  1,712,271
VEHICLE BODY CONSTRUCTION
Filed Aug. 10, 1927
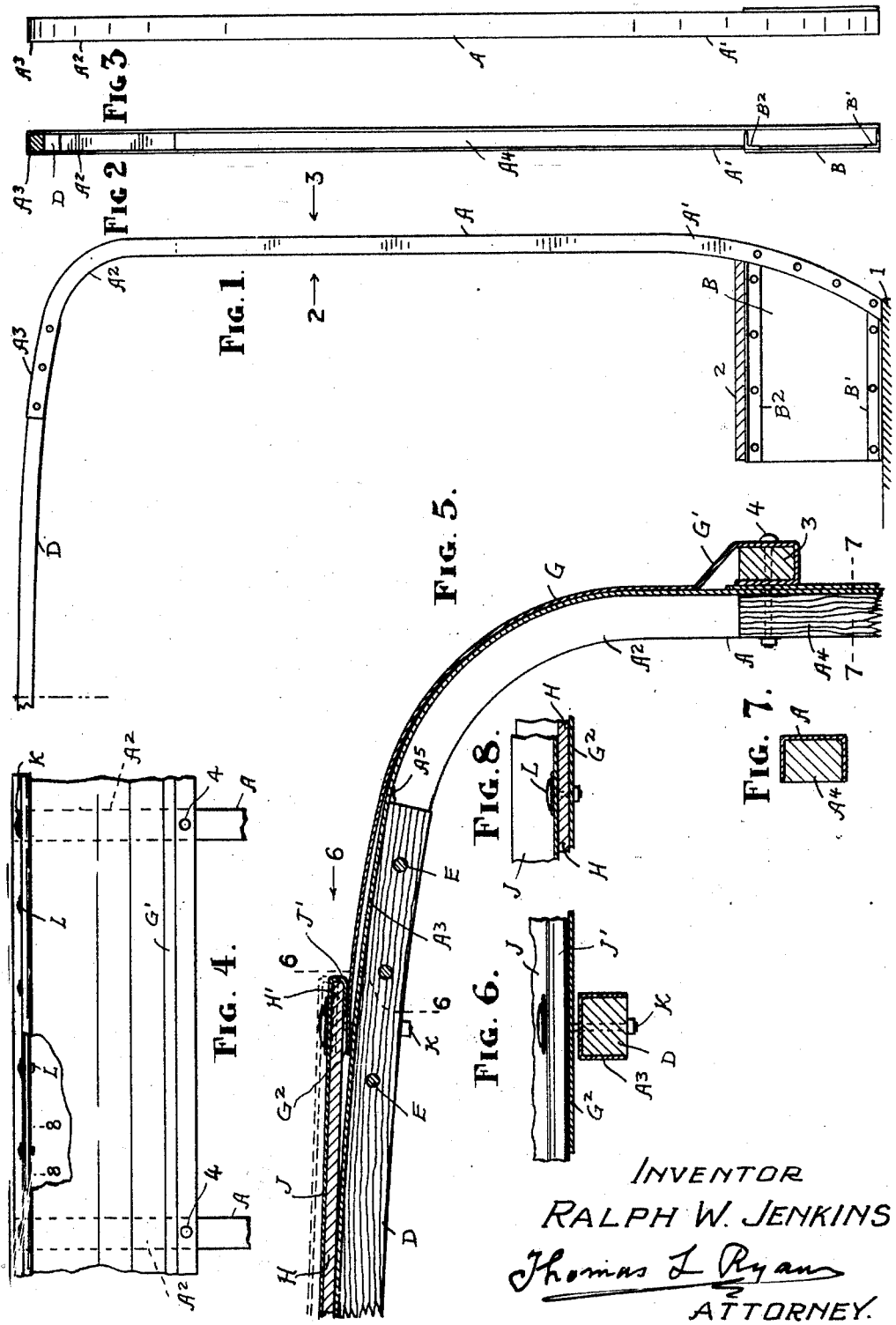
INVENTOR
RALPH W. JENKINS
Thomas L. Ryan
ATTORNEY.

Patented May 7, 1929.

1,712,271

UNITED STATES PATENT OFFICE.

RALPH W. JENKINS, OF DALEVILLE, INDIANA.

VEHICLE BODY CONSTRUCTION.

Application filed August 10, 1927. Serial No. 211,894.

This invention relates to improvements in the construction of bodies of automotive vehicles generally. A body of the class to which the present invention has especial reference, as used for busses and similar passenger carrying vehicles, comprises arched or bowed rafter elements which are supported on spaced pillars, said rafters being surmounted by a canopy structure consisting of longitudinally disposed side or panel boards, and sheathing upon which the roof covering is applied.

In the constructing of bodies of this type, there has long been the problem of the effective bracing and support of the several parts, and of the providing of a covering and connections therefor that are weatherproof and durable. In the construction of a vehicle body of this type, there is the well known arrangement of a longitudinal plate or top board to whose inside surfaces the upper ends of the spaced pillars are secured. Cross rafters having their ends curved downwardly and connected to the tops of the pillars by splice bars or brackets, are provided with sheathing upon which is applied a covering material whose side margins are terminated adjacent to or in connection with the upper portions of the said top boards by weather strips or drip molds.

On account of the nature of the service required of vehicles having bodies of the type referred to, and which said service involves the frequent stopping and starting of the travel of the vehicle on road surfaces of varying angles and degrees of incline, and the traveling over roadways of irregular alignment and surface, very severe strains on the entire canopy and pillar structure are imposed.

The general object of the present invention is to provide improvements in the pillar and canopy and roof covering construction, whereby the tendency of the structure to become impaired under the stresses imposed upon it, is overcome; and to provide a construction which is relatively light in weight and composed of a minimum number of parts, and which is economical to manufacture, neat in appearance, rugged and durable.

Further and more specific purposes of the invention which will become apparent as the specification thereof proceeds, are to provide a construction, combination and arrangement of parts whereby the amount of covering material required is minimized, and the efficient flashing thereof is facilitated.

The objects of my invention are accomplished by, and the invention is embodied in the new construction, combination, and arrangement of parts described in the following specification and illustrated in the accompanying drawings. The invention is defined in the appended claim.

The several parts of the invention, as they appear in the different views in the drawings are identified by suitable characters of reference applied to them.

Figure 1 is a side view of my improved hip-pillar and rafter construction.

Figure 2 is a view of the above structure, in the direction of the arrow 2.

Figure 3 is a view of the above structure, in the direction of the arrow 3.

Figure 4 is an elevation showing a portion of one of the girth plates, and the roof covering in position as supported by the spaced hip-pillars.

Figure 5 is an enlarged side view of the hip and shank-portion of my improved hip-pillar, there being also shown the girth plate and roof flashing detail, in cross section.

Figure 6 is a vertical cross section view taken on the line 6—6 and viewed in the direction of arrow 6 in Figure 5.

Figure 7 is a horizontal sectional view taken on the line 7—7 in Figure 5; and

Figure 8 is an enlarged longitudinal sectional view taken on the line 8—8 in Figure 4.

My invention provides opposed metal pillars channel shaped in cross section and having hip portions curved toward each other and having upwardly inclined shanks, rafters having their ends secured between the flanges of said shanks, sheathing on the rafters the marginal edges of which overlap the ends of the shanks of the pillars, resilient girth plates curved in cross section adapted to be secured at their lower edge portions to the body portions of the pillars, their upper edge portions being in registration with the under sides of the edges of the roof sheathing, means to fasten the lower edges of the girth plates to the pillars, and means to draw and hold the roof sheathing into secure engagement with the girth plate and pillar shank.

The advantages afforded by this invention are obvious. The pillars having been secured to the floor system of the vehicle in their spaced positions, the rafters are placed in position with their ends secured in the shanks of the pillars. In securing the sheathing, and the girth plates at their respective positions, it is seen that the upper edges of the girth plates are underneath the edges of the sheathing. After the edges of the roof covering will have been bent down and thence tucked between the edges of the sheathing and the edges of the girth plates, and these parts are then drawn to and held in secure connection with the shanks of the pillars, a structure of rugged strength, durability and effectiveness will have been created.

My invention is applicable in the construction of vehicle bodies of various sizes and types, same being shown in the present specification in the conformation and proportions suitable for a vehicle body about five and one half feet in width, and in which the spaces between the pillars are about twenty eight inches.

The functions intended for my newly devised frame upright being to act not only as a support for the lower parts of the side covering, but to constitute a hip for the support of the rafters and the retention of the sheathing, roof covering, and girth plates, I designate same as a hip pillar.

My improved hip pillar consists of a metal bar A, channel shaped in cross section, and which is preferably made of number sixteen or eighteen gauge sheet steel, the thickness of such metal being one sixteenth or one twentieth of an inch, respectively. The lower portion $A^1$ of said pillar is curved inwardly substantially the degree as shown in Figure 1, and is adapted to have secured thereto an upright sheet steel foot plate B. This foot plate, in turn is adapted to be secured to the vehicle floor or frame 1 by its flange $B^1$, and is provided with a top flange $B^2$ to which a seat board 2 may be secured.

The upper portion $A^2$ of this hip pillar is bent inwardly in the curved formation as shown in the drawing, and its straight portion or shank $A^3$ is inclined slightly upwardly. Retained securely between the sides of the body portion of the pillar is a wooden body shaft $A^4$ and which extends upwardly to a height practically coincident with the spring of the curve of the portion $A^2$ of the pillar, the space from this point and to the end of the shank $A^3$ being open. Spaced holes in the sides of this shank are adapted to receive the connections presently referred to. Rafter D which is made of stout wood, and which is slightly cambered, has its ends adapted to occupy the open shanks $A^3$. The ease with which the rafter may be set, and then secured in position, is obvious; the ends thereof checking to true position against the indented studs $A^5$. By screwing down the nuts on the bolts E, the sides of the shank are tightened.

In combination with the foregoing parts, I provide a girth member consisting of a resilient metal sheet of curvature in cross section to register with the general curvature of the pillar hip, and which is of length in accordance with the length of the vehicle body. The said curvature of the girth plate is such that its upper edge makes direct contact with the top surface of the shank $A^2$ when its lower portion is secured in place. The lower marginal portion of this girth plate is bent at an oblique angle, thence in direction parallel to the plate, thence at a right angle, and thence parallel to the plate, whereby a mold as shown in Figure 5 is formed. This mold besides imparting desired stiffness to the girth plate in its lower portion, constitutes the water table $G^1$ and interior channel space in which a filler element 3 may be retained. The height of the bolt 4 by which the mold is secured to the pillar is such that the upper edge $G^2$ of the girth plate is in close contact with the top surface of the pillar shank $A^3$ while the body portion of the girth plate stands slightly apart from the top surface of the hip portion $A^2$ of the pillar.

Adapted to rest directly on the tops of the rafters, and in parallelism with the girth plates, is the sheathing H. This sheathing which may consist of plywood of three-eighths of an inch thickness is of suitable length, and is of such width that its marginal portions $H^1$ overlap the edges $G^2$ of the girth plates, as plainly shown in Figure 5. After the sheathing will have been secured to the rafters by nails or screws, to a distance within eight or ten inches from the ends of the pillar shanks $A^3$ the weatherproof covering, or top material J is applied. This top material may consist of deck-cover, leather or composition sheet, or top-canvas, and it is of width a predetermined measure greater than the width of the sheathing, for the purpose to be presently referred to. To put this top material or covering J in place, it is first drawn substantially taut longitudinally at its central portion, its end portions being properly fastened. Its marginal portions are then bent downwardly and the edges $J^1$ thereof are turned under and secured by suitable cement to the undersides of the edges of the sheathing H. At this stage of the practice of the invention the edge portion of the sheathing is on a plane above that of the edge of the girth plate, as indicated by the dotted lines in Figure 5, and being sufficiently resilient to readily conform to the curvature of the rafter it is then pressed to and held in engagement with the girth plate. The operator after having drilled through the said covering, sheathing, girth plate, shank and rafter, inserts and tightens the flat headed "step" bolt K. The edge portion $G^2$ of the girth plate being normally at position apart from the top of the pillar shank, it is seen, that with the tightening of the bolt K, the turned-in portion $J^1$ of the edge $H^1$ of the top covering will have been brought into snug and close fitting and sealed contact with the said girth plate, the tension at this line of jointure being such that the bond between these parts is permanently water tight. The tension afforded by the urge upwardly of the girth plate being constant, there is no tendency for this jointure to work open or become leaky or chafed. Throughout the distance between the rafters, the marginal portions of the sheathing and its covering, are bound to the edge portion of the girth plates, by spaced flat-head step bolts L, as shown in Figure 4.

It is seen that by the new construction, combination and arrangement of parts described, the structure thus formed, is not only strong and effective for the purposes intended, but by the use of same, the quantity of wood required for the rafters and sheathing, and the quantity of top material for the roof covering, are minimized. By the use of the improved hip pillar and rafter, and the girth plates described, the work and labor of building the vehicle body in its entirety is facilitated, and is capable of being systematized. The curved portion $A^2$ of the pillar acting as the hip of the truss, and the shank $A^3$ acting as the anchorage and shoe for the rafter elements, there is afforded peculiarly rugged strength effective to withstand the most severe strains. The girth plates constructed as described, besides constituting the roof coverings and embodying the drip molds, constitute longitudinal girths of such positive strength that the hip portion of the canopy structure in its entirety, is rendered strong and durable, and uniformly free from warping or flexing tendencies.

It is understood that for the purpose of clarity in illustration, the degree of curvature of the girth plate, and the thickness thereof, and of the plywood and top-covering, are slightly distorted, the several parts, in reality, being in relatively close contact.

While in the present specification and illustration of my invention, same has been referred to in specific details and dimensions, I wish it to be understood that minor changes and modifications may be made in the several parts, their proportions, forms and details, within the scope of the invention as defined by the appended claim, without departing from the spirit of my invention or sacrificing any of its advantages.

What I claim as my invention, and desire to secure by Letters Patent, is—

In vehicle body construction, the combination of opposed pillars, each having an arcuate hip portion, rafters having their ends secured in the shank portions of said hips, resilient sheet metal girth plates having a curvature in cross section such that when the lower edge is secured to the body portion of the pillar, the extreme edge of the upper marginal portion of the girth plate is in direct engagement with the top surface of the shank of the hip, a sheathing extending at a right angle to the rafters and whose side portions overlap the upper edge portions of the said girth plates, a top material covering for said sheathing and whose edges are turned and bound to the undersides of the edges of the sheathing, and fastening means to draw the marginal portions of the sheathing toward the hip shank and to tight contact with the top surface of the girth plates.

RALPH W. JENKINS.